Dec. 1, 1959     E. J. DAUM     2,914,855
MEANS AND METHOD OF ORIENTING A SCALE
Filed Aug. 22, 1957     2 Sheets-Sheet 1
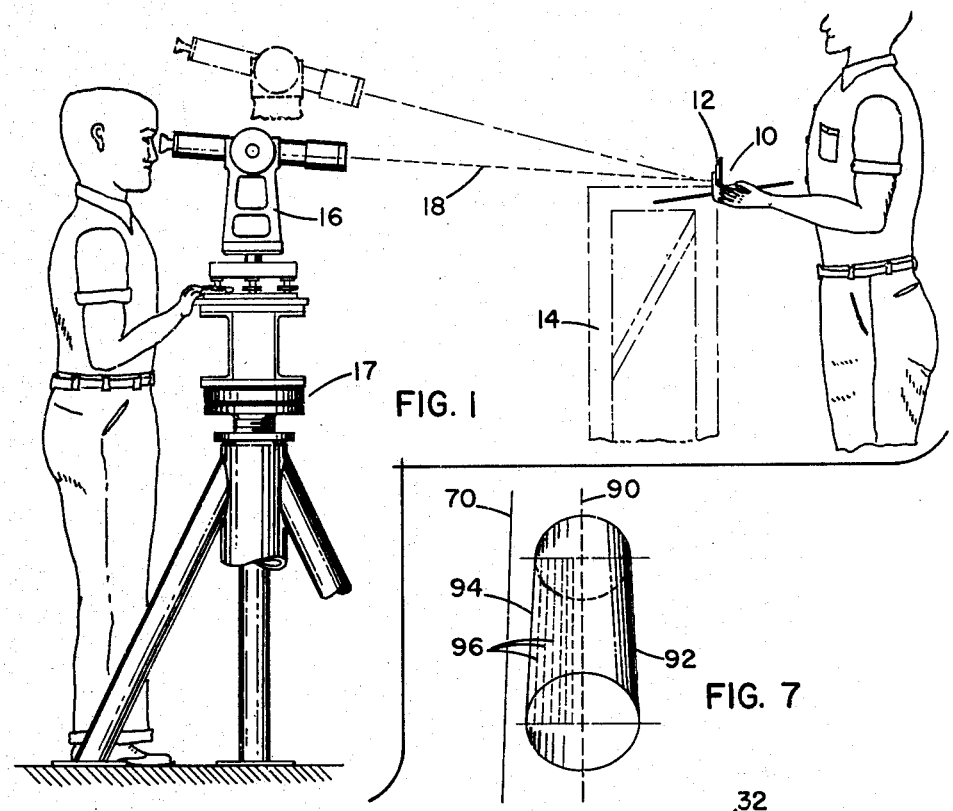
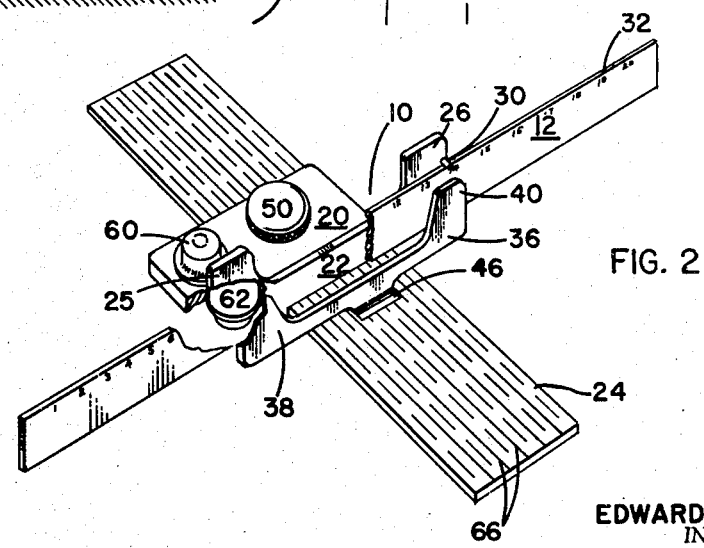
EDWARD J. DAUM
INVENTOR.

Dec. 1, 1959  E. J. DAUM  2,914,855

MEANS AND METHOD OF ORIENTING A SCALE

Filed Aug. 22, 1957  2 Sheets-Sheet 2

EDWARD J. DAUM
INVENTOR.

BY

United States Patent Office 2,914,855
Patented Dec. 1, 1959

2,914,855

MEANS AND METHOD OF ORIENTING A SCALE

Edward J. Daum, Wichita, Kans., assignor to Boeing Airplane Company, Wichita, Kans., a corporation of Delaware Application August 22, 1957, Serial No. 679,692

7 Claims. (Cl. 33—74)

My invention relates to a method and means for orienting a white faced scale relative to a line of sight of an optical instrument in optical tooling. Briefly, the specific embodiment of the device includes a body to be clamped to a scale and a registering plate having indicia forming a series of parallel registering lines extending at right angles to the scale longitudinal axis in a plane parallel to the scale longitudinal axis and disposed non-vertically and preferably at an oblique angle to the horizontal, whereby errors in orientation of the scale relative to the line of sight is indicated by misalignment of the registering lines with the optical instrument vertical cross hair.

Optical tooling is susceptible of improved accuracy over prior means of measuring production tooling such as jigs and gages. However, the close tolerances required in some applications, such as in jigs and gages for aircraft, demand the maximum accuracy possible under optical tooling methods. In using a scale in measuring from a tooling button or the like, allowable tolerances may be exceeded by inaccuracies in positioning the scale relative to the horizontal, vertical or a position normal to the line of sight of the optical instrument.

It is an object of my invention to provide an attachment for a scale which is usable to exactly orient the scale in optical tooling regarding various planes of reference and particularly regarding a position normal to the vertical plane which includes the line of sight of an optical instrument or the like.

Additional objectives include: to devise an improved method of ascertaining the orientation of a scale or other member relative to the horizontal, vertical or other planes in optical tooling and similar applications, to devise means which will indicate incorrect orientation of a scale or other member regarding such planes by reference to the cross hairs of an optical instrument or the like, and to provide the above in a time-saving, accurate and economical attachment for a scale or the like.

My invention will be best understood, together with additional objectives and advantages thereof, from a reading of the following description, read with reference to the drawings, in which:

Figure 1 is a side elevation showing a specific embodiment of my alignment attachment in use on a scale and being viewed with an optical instrument;

Figure 2 is an enlarged perspective view of the scale and attachment and has portions broken away to reveal hidden structure;

Figure 7 is a view similar to Figure 4 of a cylinder and used to explain the operation of the invention.

Figure 3:
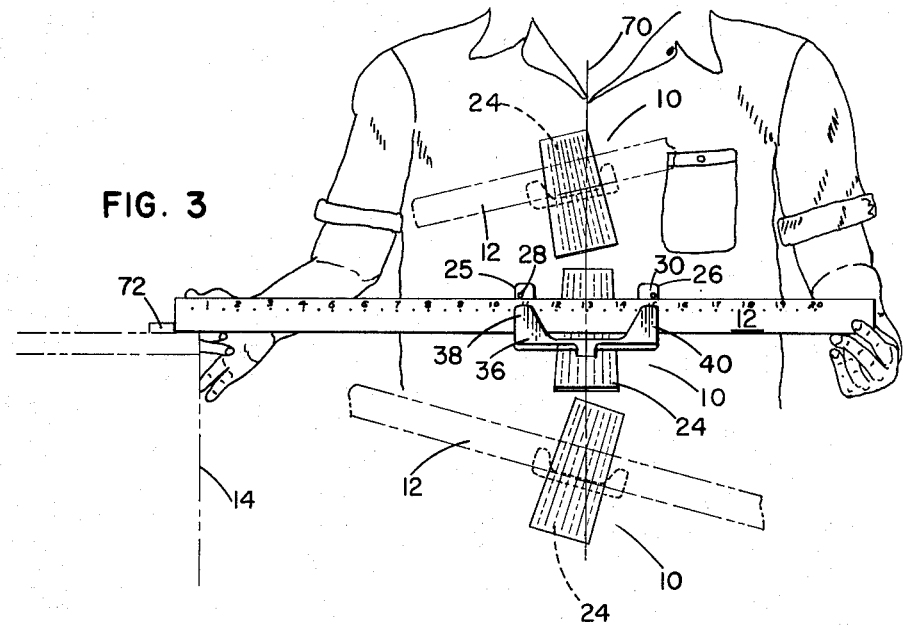
Figure 3 is a front elevation showing various positions of the registering plate of the attachment when pivoted in a vertical plane in relation to the vertical cross hair of an optical instrument.

Figure 1 shows the use of a specific embodiment of my attachment 10 secured on a scale 12 having measuring indicia on its face and being used to measure distances relative to points on a jig 14 and being viewed by an optical instrument 16 mounted on a tooling bar 17. The vertical plane including the optical instrument line of sight 18 must be at right angles to the longitudinal axis of scale 12 and the scale must be horizontally disposed to give a correct measurement from points on jig 14 to locations horizontally displaced in a vertical plane normal to the first mentioned vertical plane. A second position of the optical instrument and the line of sight is also shown in Figure 1 in dotted lines to demonstrate that the use of the attachment is not dependent on having the line of sight 18 horizontally disposed. A similar attachment may be used on bodies other than a scale when it is desired to achieve this type of orientation relative to the plane of the line of sight of the viewing means.

The detailed structure of the specific embodiment of the attachment will be described before its method of operation. A holder body 20 is provided having an upstanding wall 22 which will be vertically disposed when a registering plate 24 is disposed at an acute oblique angle to the horizontal. Various angles may be used as long as plate 24 is not vertically positioned when wall 22 and the scale 12 abutted thereto is vertical because pivoting of the scale could not be determined as to horizontal pivoting toward and away from the observer in such vertical positioning. Horizontal positioning of plate 24 would be operative, providing of course that optical instrument 16 is at a level permitting viewing of its surface, but for convenience in viewing the surface in positions such as are shown in Figure 1, preferably plate 24 is at an oblique angle to the horizontal. The drawing shows a 15° angle which is quite suitable.

Wall 22 is made lighter by being divided into two upstanding ears 25, 26. Ears 25, 26 have abutment pins 28, 30 against which the upper longitudinal edge 32 of scale 12 is abutted. The line between pins 28, 30 is parallel to the bottom face of body 20 to which registering plate 24 is secured by appropriate means, whereby the line formed by the longitudinal edge 32 of the scale is parallel to the plane of registering plate 24, as is preferred.

A clamp member 36 has a pair of upstanding ears 38, 40 disposed parallel to wall 22 to clamp scale 12 therebetween. Clamp 36 has a lower arm 44 extending through an opening 46 in registering plate 24 and positioned on the opposite side of plate 24 from body 20. A clamping screw 50 is threadedly engaged in an opening 52 in arm 44 and extends through an elongated slot 54 in body 20 whereby adjustable clamping of the scale is achieved.

Figure 5:
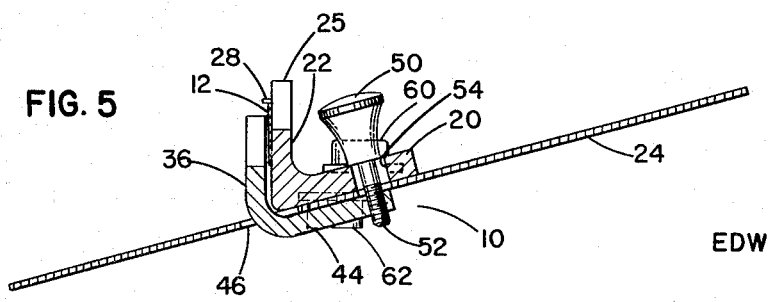
Figure 5 is a side view, on enlarged scale and principally in section, showing the attachment and a scale secured therein.

Horizontal or vertical positioning of the scale longitudinal axis may be achieved by the use of bubble levels. A pair of bubble levels 60, 62 for horizontal positioning are shown in Figure 5, the levels being positioned at right angles to the face of wall 22, and a man positioning the scale against a tooling button can use the levels for horizontal positioning as shown in Figure 3.

Registering plate 24 has indicia on its upper face forming a series of preferably coplanar parallel lines 66 extending from end to end thereof perpendicular to scale longitudinal edge 32. Alternate full and dashed lines are used to assist the viewer in distinguishing adjacent lines. The face is preferably although not necessarily flat. Referring to Figure 1, it will be seen that, when optical instrument 16 has a position substantially below scale 12, attachment 10 is viewed better in an inverted position. When inverted, the scale lower longitudinal edge rather than the upper edge will be abutted to abutment pins 38, 40 and bubble level 62 will be used.

Figure 4:
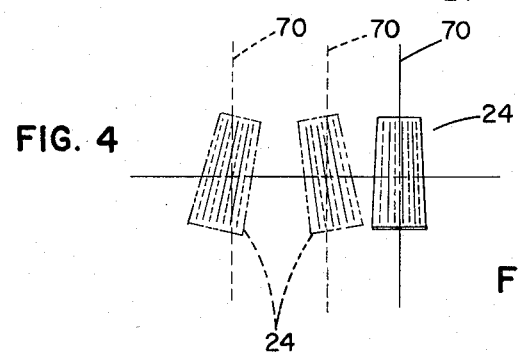
Figure 4 is a view similar to Figure 3, only being partially schematic, showing the relation of the registering plate to the vertical cross hair in three positions when the scale is pivoted in a horizontal plane, the displacement of the plate being exaggerated to avoid superposition.

Figure 3 shows how registering lines 66 indicate misalignment of the scale relative to the vertical cross hair 70 of an optical instrument as the scale is raised or lowered vertically from a horizontal position. Of course this showing is exaggerated and small inaccuracies will be readily observed. Lines 66 are preferably straight although they may be bowed in parallel planes. Figure 4 shows the misalignment of registering lines 66 relative vertical cross hair 70 as the scale 12 is pivoted horizontally about a tooling button 72 on jig 14 toward and away from the observer, e.g., when there is an inaccuracy in the position of the scale relative to the normal to a vertical plane including the line of sight 18 and the vertical cross hair 70. In Figure 4, the three positions of plate 24 are shown side by side and three vertical cross hairs 70 are shown for clarity of illustration, although of course there is only one vertical cross hair and the three images would be practically superimposed in actual viewing. Reading from right to left in Figure 4, the first position of plate 24 relative to cross hair 70 is achieved when the scale is at right angles to the line of sight, the middle presentation is seen when the scale is pivoted away from the observer and the position at the left is achieved when the registering plate 24 is pivoted toward the observer.

As shown in Figure 1, two men are commonly used in this optical tooling operation and one man is holding the scale and can position the scale relative to the horizontal by observing bubble level 60 or 62, whichever is uppermost. Therefore, in many applications the orienting of the scale against vertical pivoting, as shown in Figure 3, is not needed.

The present attachment finds most use in checking the scale orientation as to pivoting toward and away from the observer, as shown in Figure 4. The man holding the scale does not have means to check whether or not the plane of the face of the scale is normal to the vertical plane which includes the vertical cross hair 70 and the line of sight 18. Prior to my invention, the common method of trying to check against inaccuracies due to this forward and rearward pivoting was to have the man holding the scale pivot it forward and backward and the measurement was taken as the smallest reading shown during this pivoting action. It will be understood that this was not a satisfactory method of checking inaccuracies in applications requiring the maximum accuracy capable from optical instruments. The present invention checks this orientation by comparison of the alignment of cross hair 70 with the nearest registering line 66.

Although in the type of operations shown in Figures 1 and 3 the ability of attachment 10 to be used to check horizontal positioning is of secondary importance, in other applications of the attachment in the general field of optical tooling, surveying and the like it may be desirable to use the principle of the invention to check both vertical and horizontal positioning. However, in the absence of the use of bubble levels, the attachment can not be used to check both horizontal and vertical pivoting at the same time without the risk of error when the construction shown in Figures 3 and 4 is used. This error occurs because the scale might be pivoted in a manner appearing to show proper positioning when such was not the case. For example if the scale were lowered vertically at an angle sufficient to provide the showing of misalignment in the lowermost position in Figure 3 and were also pivoted rearwardly a distance sufficient to produce the optical comparison shown in the middle view in Figure 4, the angles plus and minus relative to a clockwise direction might balance out so that the registering lines 66 would still register with the vertical cross hair 70 although misorientation was present relative to a scale position normal to the cross hair line of sight plane. As will be explained in more detail later, this error appears because the resulting pivotal action is in a plane perpendicular to the registering lines.

Figure 6:
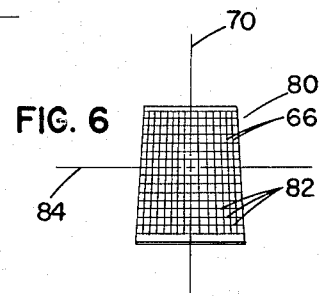
Figure 6 is a view similar to Figure 4 of a modified form of registering plate in which there are two sets of parallel registering lines at right angles to each other, the vertical and horizontal cross hairs of an optical instrument being superimposed on the plate.

To provide an attachment which will check both vertical pivoting and pivoting toward and away from the observer in the absence of the use of bubble levels, the registering plate 80 of Figure 6 may be used. In addition to the first set of registering lines 66, in Figure 6 a second set of parallel lines 82 at right angles to lines 66 is used. By comparing these lines with both the vertical and horizontal cross hairs 70, 84, it is then possible to determine at one time both the vertical and the forward and backward pivoting of the scale or the like. By providing a series of lines 66 and 82, one line will be contiguous with each cross hair for increased accuracy and convenience in viewing. It will be understood that in Figure 4 and Figure 6 presentations the plates are positioned on a holder body 20 in the same manner that plate 24 is shown in Figure 5.

The operation of the specific embodiment of my invention may be understood from the foregoing description and the drawings. However, the principle of the invention and its application to other embodiments requires careful analysis and study in order to be fully understood. The use of a series of registering lines 66 is an important convenience so that plate 24 does not have to be adjusted to the point that a single reference line would be close enough to the optical instrument cross hair to compare parallelism. However, the invention should be considered as it applies to a single registering line 66 however formed.

Considering a single registering line 66, a first limitation of its use to indicate a position of an attached scale relative to the line of sight is that correct orientation of the scale can not be observed by use of the line if the registering line is pivoted in a plane parallel to the plane including the cross hair and line of sight. In other words, the use of parallel horizontal lines on a horizontally disposed scale could not indicate pivoting toward and away from the observer. Likewise, the use of vertical registering lines on a scale in depending position could not be used to observe pivoting in a vertical plane toward and away from the observer.

A second limitation of the use of the invention, basic to its principle of operation, is as follows. Considering pivoting of the scale toward and away from the observer in Figure 3, a vertically disposed plate 24 having a series of parallel vertical lines would not indicate the pivotal movement by reference to the vertical cross hair. All that would be observed would be contraction of the space between registering lines. This is because the scale is being pivoted about an axis parallel to the registering lines. As before observed, if the scale were lowered vertically to the lowermost position in Figure 3 and were also pivoted rearwardly to the middle position in Figure 4, the angles plus and minus relative to a clockwise direction might balance out so that the registering lines 66 would appear parallel to the vertical cross hair 70 although misorientation was present. This was because the scale was pivoted in a plane perpendicular to the registering lines.

To explain the reason for the foregoing, Figure 7 is provided. The pivotal axis about which the scale is pivoted may be considered to be the axis 90 of a cylinder 92 and the registering line to be a line of generation 94 of the cylinder or any other line parallel to the cylinder axis. A plurality of registering lines may be considered as a succession of lines of generation 96 relative to the common axis 90 whereby the lines would form concentric cylinders. If cylinder 92 is then viewed in the manner shown in Figure 7, it will be observed that if axis 92 of the cylinder is parallel to the vertical cross hair 70, then all lines of generation 94, 96 will be parallel to the cross hair. Considering a series of lines of generation about the cylinder, these may be thought of as the various positions a registering line 66 would assume when pivoted about the cylinder axis. Following the analogy of the cylinder, change in parallelism of a registering line 66 and a cross hair 70 will not be observed when the scale is pivoted about a pivotal axis parallel to the registering line 66, regardless of the position of the axis or the line.

Having thus specifically described my invention, I do not wish to be understood as limiting myself to the precise details of construction shown, but instead wish to cover those modifications thereof which will occur to those skilled in the art from my disclosure and which fairly fall within the scope of my invention, as described in the following claims.

I claim:

1. An alignment device and an elongated scale on which said device is fitted to orient the scale relative to a plane including the line of sight and a vertical cross hair of an optical instrument, comprising: said alignment device having a holder body having abutment means and said holder body having securing means securing said body to said scale and holding a longitudinal edge of the scale abutted to said abutment means, said scale having a face having measuring indicia thereon to be positioned normal to said plane, and a registering plate secured to said holder body having a face having indicia thereon forming a series of parallel registering lines extending at right angles to said scale longitudinal edge, the plane of said plate face being disposed parallel to said longitudinal scale edge and extending at an oblique angle relative to said scale face whereby orientation of said scale normal to said plane during pivoting of said scale toward and away from the optical instrument is indicated by alignment of the nearest registering line with said vertical cross hair.

2. The subject matter of claim 1 in which there is bubble level means secured to said body and said bubble level means being posiitoned relative to said scale so that the bubble is centered when said scale longitudinal edge is horizontally disposed.

3. An alignment device and a scale on which said device is fitted to orient the scale relative to a plane including the line of sight and a cross hair of an optical instrument, comprising: said scale being elongated and having a flat face having measuring indicia thereon, said alignment device having a holder body having securing means securing said body to said scale, and a registering plate secured to said holder body having a face having indicia thereon forming a series of parallel registering lines extending at right angles to the scale longitudinal axis and said registering lines extending at an oblique angle relative to said scale face, whereby orientation of said scale normal to said plane during pivoting of said scale toward and away from the optical instrument is indicated by alignment of the nearest registering line with the cross hair of the optical instrument.

4. An alignment device and a scale on which said device is fitted to orient the scale relative to a plane including the line of sight and a first cross hair of an optical instrument, comprising: said scale being elongated and having a flat face having measuring indicia thereon, said alignment device having a holder body having securing means securing said body to said scale, and a registering plate secured to said holder body having a face having indicia thereon forming a first series of registering lines extending at right angles to the scale longitudinal axis and said registering lines extending at an oblique angle relative to said scale face, whereby orientation of said scale normal to said plane during pivoting of said scale toward and away from the optical instrument is indicated by alignment of the nearest registering line with the first cross hair of the optical instrument, said registering plate having indicia thereon forming a second series of registering lines superposed to and extending at right angles to said first series of registering lines, said second series of registering lines extending parallel to said scale longitudinal axis, whereby orientation of the scale longitudinal axis parallel to the second cross hair of the optical instrument is indicated by alignment of the nearest of the second series of registering lines with the second cross hair of the optical instrument.

5. An alignment device to be secured to an elongated scale or the like for orienting the scale relative to a plane including the line of sight and a cross hair of an optical instrument, comprising: a holder body having abutment means including planar abutment means defining a plane and to be abutted to the scale face and including aligned abutment means defining a line and to be abutted to a longitudinal edge of the scale and said holder body having securing means for securing the scale to said body in abutment with said abutment means, and a registering plate secured to said holder body having a face having indicia thereon forming a series of parallel registering lines extending at right angles to said line defined by said aligned abutment means, the plane of said plate face being disposed parallel to said line defined by said aligned abutment means and extending at an oblique angle relative to said plane defined by said planar abutment means, whereby orientation of the scale or the like normal to said first-mentioned plane during pivoting of the scale toward and away from the optical instrument is indicated by alignment of the nearest registering line with the cross hair.

6. The subject matter of claim 5 in which there is bubble level means secured to said body and said bubble level means being positioned relative to said line defined by said aligned abutment means so that the bubble is centered when said line defined by said aligned abutment means is horizontally disposed.

7. The subject matter of claim 5 in which said registering plate has indicia thereon forming a second series of registering lines superposed to and extending at right angles to the first-mentioned series of registering lines, said second series of registering lines extending parallel to said line defined by said aligned abutment means, whereby orientation of the scale longitudinal edge parallel to the second cross hair of the optical instrument is indicated by alignment of the nearest of the second series of registering lines with the second cross hair of the optical instrument.

References Cited in the file of this patent

UNITED STATES PATENTS

| 405,058 | Thompson | June 11, 1889 |

FOREIGN PATENTS

| 1,501 | Great Britain | Apr. 18, 1877 |
| 94,550 | Austria | Oct. 10, 1923 |